3,206,415
PREPARATION OF A POLYURETHANE FOAM USING AN ORGANOSILOXYMETHYL ALKANE AS A FOAM STABILIZER
Horst Koepnick, Cologne-Stammheim, Günther Loew, Cologne, and Detlef Delfs, Opladen, Germany, assignors to Farbenfabriken Bayer Aktiengesellschaft, Leverkusen, Germany, a corporation of Germany
No Drawing. Filed Dec. 20, 1960, Ser. No. 77,018
Claims priority, application Germany, Dec. 31, 1959, F 30,216
8 Claims. (Cl. 260—2.5)

This invention relates generally to the preparation of polyurethane plastics, and more particularly, to an improved method of preparing a cellular polyurethane.

Cellular polyurethanes, or in other words, polyurethane foams, have been prepared heretofore by the reaction between a resinous material such as a polyester or polyalkylene ether having terminal hydroxyl groups and water with an organic polyisocyanate. The polyester or polyalkylene ether reacts with the polyisocyanate to form addition products of greater molecular weight and the water reacts with isocyanato groups to form carbon dioxide. As chain lengthening occurs, the reaction mixture becomes more and more viscous and finally solidifies into a polyurethane plastic. The carbon dioxide formed during the reaction becomes entrapped in the viscous reaction mixture and causes the formation of pores or cells in the solidified product.

In the original commercial process for making polyurethane foams, a polyester, polyisocyanate, water and catalyst were all mixed together at substantially the same time. It became apparent as the technology continued to develop that polyurethane foams having improved characteristics could be prepared from polyalkylene ether glycols instead of polyesters. It was found, however, that if the components of a reaction mixture are mixed together substantially simultaneously, the reaction mixture collapses after expansion but before solidification. Consequently, the earlier commerically important processes for making polyurethane foams from polyalkylene ether glycols were two-step processes in which the polyalkylene ether glycol was reacted under substantially anhydrous conditions in a first step with an organic polyisocyanate to form a prepolymer and this prepolymer and excess organic polyisocyanate were then reacted in a second step with water to form the polyurethane foam.

It was later determined that a polyurethane foam could be made from a polyalkylene ether glycol in a one-step process provided a proper catalyst and a suitable stabilizing agent were included in the reaction mixture. The conventional silcone oils used as stabilizers in the preparation of polyurethane foams from polyesters are not suitable for stabilizing a polyurethane foam made from polyalkylene ether glycols against collapse prior to solidification. Such silicone oils are dialkyl siloxanes and have been disclosed for use in polyester foams in French Patent 1,153,994. It has also been proposed to use a siloxane oxyalkylene block copolymer of the type disclosed in U.S. Patent 2,834,748, for stabilizing polyurethane foams prepared from polyalkylene ether glycols. Although the siloxane oxyalkylene block copolymers are an improvement over the dialkyl siloxanes, they have the disadvantage of requiring relatively close adherence to set formulations which introduces an inconvenience in commercial production and makes it difficult to repeatedly produce foams having the same physical characteristics.

It is therefore an object of this invention to provide an improved method for stabilizing polyurethane foams. Another object of the invention is to provide a method for making polyurethane foams which permits larger variation in formulation than the heretofore available processes. Still another object of the invention is to provide a method for making polyurethane foams which is particularly well suited for making polyurethane foams from polyalkylene ethers having terminal hydroxyl groups. A more specific object of the invention is to provide an improved method of preventing a polyurethane foam reaction mixture from collapsing prior to solidification into a polyurethane foam.

The foregoing objects and others which will become apparent from the following description are accomplished in accordance with this invention, generally speaking, by providing a method for making a polyurethane foam wherein an organic compound having at least two reactive hydrogen atoms, a molecular weight of at least about 500, an hydroxyl number of not more than about 225 and an acid number of not more than about 10 is reacted with an organic polyisocyanate in a reaction mixture containing an inert gas and an organosiloxymethyl alkane having the formula $$[R\{O-CH_2-CR'H\}_xO\{Si(CH_3)_2-O\}_yCH_2-]_nCR''_{4-n}$$

in which R represents a monovalent lower alkyl radical having from 1 to 5 carbon atoms, R' and R'' represent hydrogen atoms or monovalent lower alkyl radicals having 1 to 5 carbon atoms, $x$ is a whole number greater than 3, $y$ is a whole number greater than 2 and $n$ is 3 or 4.

Although the invention is most important in the preparation of polyurethane foams from a polyalkylene ether having at least two alcoholic hydroxyl groups, it is equally applicable for the stabilization of a foam prepared from any other organic compound having at least two reactive hydrogen atoms with the molecular weight and other characteristics set forth above. The invention thus contemplates in its broadest aspects a process for stabilizing any polyurethane foam reaction mixture against collapse and is not concerned with the selection of a particular resinous reactant such as, for example, the polyester of polyalkylene ether glycol. The invention is in the nature of an improvement on all existing processes for making polyurethane foams regardless of the type of compound reacted with the polyisocyanate to form the polyurethane. However, because of the difficulty heretofore in stabilizing reaction mixtures prepared from polyalkylene ethers and polyisocyanates and particularly reaction mixtures prepared from polyalkylene ethers having secondary hydroxyl groups, the invention is most applicable to processes using polyalkylene ethers so those processes are preferred.

It has been found that the addition of an organosiloxymethyl alkane having the formula set forth above, reduces the sensitivity of the reaction mixture which makes it possible for variations to occur in a set formulation without spoiling the product. The use of the stabilizer of this invention thus adapts a process for making a polyurethane foam to commercial application and permits repeated production of similar polyurethane foams. Although the heretofore available dialkyl siloxanes will not prevent collapsing of a reaction mixture prepared from a polyalkylene ether glycol having secondary hydroxyl groups, even a trace of the stabilizng agent provided by this invention is of value in the reaction mixture. Hence, in its broadest aspects, the invention contemplates the use of any amount of the stabilizer but it is preferred to use about 0.001 percent to about 10 percent by weight based on the weight of organic compound having at least two reactive hydrogen atoms such as, a polyalkylene ether glycol. Best results are obtained with from about 0.1 percent to 5 percent stabilizer based on the weight of the organic compound having at least two reactive hydrogens. It is important to note that the stabilizer of the invention can be employed in a smaller amount than the siloxane oxy alkylene block copolymers known heretofore. In the usual foam formulation 1–1.5% of the known block copolymers are employed while in the very same foam formulation 0.4–1% of the stabilizers of the present invention are fully sufficient.

The organosiloxymethyl alkanes contemplated as a stabilizing agent by this invention can be prepared by any method including for example the method described in a U.S. application Serial No. 75,113 filed December 12, 1960, by Horst Koepnick, Detlef Delfs, and walter Simmler. For example, the organosiloxy alkanes can be prepared by transesterification of an alpha, omega-dialkoxypolydimethylsiloxane at one end of the silicone chain with a tris-(hydroxymethyl) alkane or with pentaerythritol and at the other end with a monoalkyl ether of a polyalkylene ether glycol. Preferably, the transesterification processes for preparing the organosiloxymethyl alkane are catalytic processes at a temperature of from about 50° C. to about 300° C. Suitable catalysts are, for instance, halogenated fatty acids, and more especially fluorinated fatty acids. Any suitable alpha, omega-dialkoxypolydimethylsiloxane may be used in the esterification such as, for example, alpha,omega-dimethoxy tri-(dimethyl siloxane), alpha,omega-diethoxy tetra-(dimethyl siloxane), alpha,omega-dipropoxy tri(dimethyl siloxane), alpha,omega-dibutoxy tri(dimethyl siloxane), alpha,omega-dimethoxy hexa (dimethyl siloxane), alpha, omega-diethoxy deka (dimethyl siloxane) and the like. The tris-(hydroxymethyl) alkane can be any suitable compound of this type such as, for example, trimethylolpropane, trimethylolethane, tri(hydroxymethylolmethane), trimethylolbutane, and the like. The polyalkylene ether glycol monoalkyl ether may be prepared by any known process such as, for example, by condensation of ethylene oxide, propylene oxide, butylene oxide, styrene oxide, or mixtures thereof, or the like. Examples of such compounds include tris-(butoxy dioxypropylene-dioxyethylene tridimethylsiloxymethyl) propane, tris-(propoxy tetraoxypropylene tri-dimethylsiloxymethyl)-propane, tris-(ethoxy tetraoxyethylene tri-dimethylsiloxymethyl)-ethane, and the like. Preferably, the organosiloxymethyl alkane contemplated by this invention has a molecular weight of not more than about 1200 but any compound represented by the above formula which is soluble in at least one of the reactants can be used.

Any organic compound having at least two reactive hydrogen atoms as determined by the Zerewitinoff method described by Kohler in the J. Am. Chem. Soc. 49, 3181 (1927) having the characteristics set forth above can be used in practicing this invention as the resinous component which is reacted with the organic polyisocyanate. In addition, the invention contemplates mixtures of various compounds of this type. For example, any suitable hydroxyl polyester can be used such as, for example, an ester prepared from any aliphatic or aromatic polycarboxylic acid and a polyhydric alcohol. Any polycarboxylic acid can be used in the preparation of the polyester including for example adipic acid, succinic acid, suberic acid, sebacic acid, oxalic acid, methyladipic acid, glutaric acid, pimelic acid, azelaic acid, phthalic acid, terephthalic acid, isophthalic acid, 1,2,4-benzene tricarboxylic acid, thiodiglycollic acid, thiodipropionic acid, maleic acid, fumaric acid, citraconic acid, itaconic acid and the like. Any suitable polyhydric alcohol may be used such as, for example, ethylene glycol, propylene glycol, butylene glycol, hexanediol, bis-hydroxymethylcyclohexane), trimethylolpropane, trimethylolethane, hexanetriol, glycerine, pentaerythritol, sorbitol, xylylene glycol, p-phenylene di(beta,-hydroxyethylether), and the like.

The resinous component of the reaction mixture can be any suitable polyalkylene ether having at least two terminal alcoholic hydroxyl groups such as, for example, the condensation product of an alkylene oxide with a small amount of a compound containing reactive hydrogen containing groups including for example water, ethylene glycol, propylene glycol, butylene glycol, amylene glycol, trimethylolpropane, glycerene, pentaerythritol, hexanetriol, and the like. Any suitable alkylene oxide may be used in the condensation such as, for example, ethylene oxide, propylene oxide, butylene oxide, amylene oxide, mixtures thereof, and the like. Furthermore, tetrahydrofuran can be polymerized to form a suitable polytetramethylene ether glycol. The condensation of the alkylene oxide to form a suitable polyalkylene ether having terminal hydroxyl groups can be prepared by any suitable condensation process such as, for example, by the process described by Wurtz in the "Encyclopedia of Chemical Technology," volume 1, pages 257–262, published by interscience Publishers in 1951. The process described in U.S. Patent 1,922,459 can also be used for making a suitable polyalkylene ether having terminal hydroxyl groups. Suitable polyalkylene ethers can also be prepared from epichlorohydrin or styrene oxide. Condensates of the alkylene oxides with amines such as, for example, ethylene diamine, hexamethylene diamine, aniline, or phenylene diamine can also be used.

Any suitable polyesteramide may be used such as, for example, the reaction product of an amine or an amino alcohol with a polycarboxylic acid. Any suitable amine such as, for example, ethylene diamine, propylene diamine, hexamethylene diamine, phenylene diamine, and the like may be used. Any suitable amino alcohol such as, for example, ethanolamine, 3-aminopropanol and the like may be used. Any of the polycarboxylic acids set forth above with relation to the preparation of hydroxyl polyesters may be used in the preparation of polyesteramides. The polyesteramides may also be prepared by reacting dioldiamides such as, for example, the reaction product of adipic acid and diethanolamine and terephthalic acid-bispropanolamide with dicarboxylic acids.

Any suitable polyhydric polythioether may be used such as, for example, the reaction product of one of the aforementioned alkylene oxides used in the preparation of the polyhydric polyalkylene ether with a polyhydric thioether such as, for example, thiodiglycol, 3,3'-dihydroxy propylsulfide 4,4'-dihydroxy butylsulfide, 1,4-(beta-hydroxyethyl)phenylene dithioether, and the like. Examples of suitable polyhydric polythioethers which may be used in the method of this invention are set forth in U.S. Patents 2,862,972 and 2,900,368.

Any suitable polyacetal may be used such as, for example, the reaction product of an aldehyde with a polyhydric alcohol. Any suitable aldehyde may be used such as, for example, formaldehyde, paraldehyde, butyraldehyde, and the like. Any of the polyhydric alcohols mentioned above with relation to the preparation of hydroxyl polyesters may be used.

Any suitable organic polyisocyanate may be utilized in the process of this invention such as, for example, aliphatic polyisocyanates, aromatic polyisocyanates, alicyclic polyisocyanates and heterocyclic polyisocyanates, including such as, for example, ethylene diisocyanate, ethylidene diisocyanate, propylene diisocyanate, butylene diisocyanate, cyclopentylene-1,3-diisocyanate, cyclohexylene-1,4-diisocyanate, cyclohexylene-1,2-diisocyanate, 2,4-toluylene diisocyanate, 2,6-toluylene diisocyanate, 4,4'-diphenylmethane diisocyanate, 2,2-diphenyl-propane-4,4'-diisocyanate, p-phenylene diisocyanate, m-phenylene diisocyanate, xylylene diisocyanate, 1,4-naphthylene diisocyanate, 1,5-naphthylene diisocyanate, diphenyl-4,4'-diisocyanate, azobenzene-4,4'-diisocyanate, diphenylsulfone-4,4'-diisocyanate, dichlorohexamethylene diisocyanate, tetramethylene diisocyanate, pentamethylene diisocyanate, hexamethylene diisocyanate, 1-chlorobenzene-2,4-diisocyanate, 4,4',4''-triisocyanato triphenylmethane, 1,3,5-triisocyanato benzene, 2,4,6-triisocyanato toluene, 4,4'-dimethyl diphenyl methane-2,2',5,5'-tetraisocyanate, furfurylidene diisocyanate, and the like. Of the various polyisocyanates which can be used, best results are obtained with toluylene diisocyanate and particularly wtih an isomeric mixture of 80 percent 2,4-toluylene diisocyanate and 20 percent 2,6-toluylene diisocyanate, so the toluylene diisocyanates are preferred.

Polyurethane foams can be prepared in accordance with this invention by the usual manipulative steps. For example, the organic compound having at least two reactive hydrogen atoms, the organic polyisocyanate, water, catalysts, emulsifiers and other components of the reaction mixture along with the organosiloxymethyl alkanes can all be mixed together substantially simultaneously. An apparatus particularly well suited for effecting the mixture of the components for forming the reaction mixture is described in Reissue Patent 24,514. Athough it is preferred to use a compound having terminal alcoholic hydroxyl groups, the invention contemplates compounds having terminal carboxyl groups and if the resinous components contain a large number of carboxyl groups, it is not always necessary to add water to the reaction mixture.

Any suitable catalyst such as, for example, a tertiary amine or an organo metallic compound can be used. For example, the tertiary amine can be dimethyl benzyl amine; an N-alkyl morpholine, including N-ethyl morpholine, N-methyl morpholine, and the like; an N,N'-dialky piperazine incuding N,N'-diethyl piperazine, N,N'-dipropyl piperazine, and the like; N,N'-endoethylene piperazine; 1-alkoxy-3-dimethyl amino propane including 1-methoxy-3-dimethyl amino propane, and the like; alkalis including sodium hydroxide; alkali metal phenolates including sodium phenolate; alkali metal alcoholates such as sodium octylate; alkali earth metal oxides including calcium oxide; and salts of amines and organic acids including diethyl amino oleate; tin compounds including stannous oleate, stannous octoate, dibutyl tin dilaurate, dibutyl tin di(2-ethyl hexoate), and the like, or any other metal catalysts disclosed in U.S. application Serial No. 678,437, filed August 15, 1957 and in U.S. Patent 2,916,464.

Any suitable emulsifier can be used along with the organosiloxymethyl alkane in accordance with this invention such as, for example, sulphonated castor oil. Various other additives including paraffin oils and nitrogen free silicone oils can be added to regulate the pore size of the foam. Likewise, fillers, dye stuffs and plasticizers can be used, if desired. As already pointed out the siloxane oxyalkylene block copolymers have the disadvantage of requiring relatively close adherence to said formulations. The stabilizers of the present invention, however, allow for a broader spectrum of amounts to be added to a specific set formulation without spoiling the product. Furthermore, a much smaller amount of the stabilizers of the present invention has the very same effect as compared with the known block copolymers. Another important advantage over the known block copolymers resides in the better resistance against hydrolytic influence which is shown by the stabilizers of the invention. Better stability against hydrolysis is an important feature in that in practice the stabilizer is premixed with the activator and the water as a so-called activator mixture which now can be easier handled and stored.

In order better to describe and further clarify the invention, the following are specific embodiments thereof.

*Example 1*

About 100 parts by weight of a polypropylene ether having terminal hydroxyl groups prepared by condensation of propylene oxide and trimethylolpropane and having an hydroxyl number of about 56 and a molecular weight of about 2000, about 36 parts by weight of a mixture of 80 percent 2,4-toluylene diisocyanate and 20 percent 2,6-toluylene diisocyanate, about 1.45 parts of an activator mixture, about 0.9 part of tris-(butoxy dioxypropylene dioxethylene tri-dimethylsiloxymethyl)propane and about 2.7 parts water are mixed together substantially simultaneously in an apparatus of the type disclosed in Reissue Patent 24,514. The activator mixture contains about 0.2 part endoethylene piperazine, about 1.2 parts dimethyl benzyl amine and about 0.05 part dibutyl tin dilaurate. The water and organosiloxymethyl alkane can be mixed together and then added as a solution to the other components of the reaction mixture. Immediately after a uniform mixture is obtained, the resulting reaction mixture is poured into a suitable mold. Chemical reaction occurs almost immediately with expansion of the reaction mixture into a polyurethane foam having the following mechanical properties:

Weight per unit volume _____kg./cm.$^3$__ 33
Tensile strength according to DIN 53,572
    kg./cm.$^2$__ 1.2
Breaking elongation according to DIN 53,572
    percent__ 360
Compressive hardness at 40% compression
    g./cm.$^2$__ 31
Impact elasticity according to DIN 53,573 _percent__ 54
Permanent deformation according to DIN 53,572
    percent__ 9

*Example 2*

About 100 parts by weight of a polypropylene ether having terminal hydroxyl groups prepared by condensation of propylene oxide and trimethylol propane and having an hydroxyl number of about 45 and a molecular weight of about 2500, about 37 parts by weight of a mixture of 80 percent 2,4-toluylene diisocyanate and about 20 percent 2,6-toluylene diisocyanate, about 2.0 parts of an activator mixture, about 1.5 parts of tris-(butoxy dioxypropylene-monooxyethylene hexa-dimethylsiloxymethyl) ethane and about 2.9 parts water are mixed together substantially simultaneously in an apparatus of the type disclosed in Reissue Patent 24,514. The activator mixture contains about 0.2 part permethylated aminoethyl piperazine, about 1.2 parts dimethyl benzyl amine and about 0.6 part dibutyl tin di(2-ethyl hexoate). The water and organosiloxymethyl alkane can be mixed together and then added as a solution to the other components of the reaction mixture. Immediately after a uniform mixture is obtained, the resulting reaction mixture is poured into a suitable mold. Chemical reaction occurs almost immediately with expansion of the reaction mixture into a foam having the following mechanical properties:

Weight per unit volume _____kg./m.$^3$__ 32
Tensile strength according to DIN 53,572
    kg./cm.$^2$__ 1.6
Breaking elongation according to DIN 53,572
    percent__ 340
Compressive hardness to 40% compression
    g./cm.$^2$__ 45
Impact elasticity according to DIN 53,573 _percent__ 52
Permanent deformation according to DIN 53,572
    percent__ 8

*Example 3*

About 100 parts by weight of a polypropylene ether having terminal hydroxyl groups prepared by condensation of propylene oxide and trimethylolpropane and having an hydroxyl number of about 56 and a molecular weight of about 2000, about 38 parts by weight of a mixture of 80 percent 2,4-toluylene diisocyanate and 20 percent 2,6-toluylene diisocyanate, about 0.6 part of an activator mixture, about 0.4 part of tris-(butoxy monooxypropylenedioxyethylene deka - dimethylsiloxymethyl) methane and about 2.7 parts water are mixed together substantially simultaneously in an apparatus of the type disclosed in Reissue Patent 24,514. The activator mixture contains about 0.5 part permethylated aminoethyl piperazine and about 0.1 part dibutyl tin dilaurate. The water and organosiloxymethyl alkane can be mixed together and then added as a solution to the other components of the reaction mixture. Immediately after a uniform mixture is obtained, the resulting mixture is poured into a suitable mold. Chemical reaction occurs almost immediately with expansion of the reaction mixture into a foam which solidifies to form a polyurethane foam having the following mechanical properties:

Weight per unit volume _____ kg./m.³__ 33
Tensile strength according to DIN 53,572
    kg./cm.²__ 1.3
Breaking elongation according to DIN 53,572
    percent__ 350
Compressive hardness at 40% compression
    g./cm.²__ 35
Impact elasticity according to DIN 53,573 percent__ 58
Permanent deformation according to DIN 53,572
    percent__ 8

It is to be understood that any other resinous component, organic polyisocyanate, accelerator or catalyst, emulsifying agent or other component listed as suitable herein can be substituted in the foregoing examples if desired. Moreover, it is possible to add a blowing agent to the reaction mixture such as, for example, carbon dioxide or any other compound which is a gas at the reaction temperature. Dichlorodifluoromethane, trichlorofluoromethane or the like can be used for this purpose either alone or in combination with water in the reaction mixture.

Although the invention has been described in considerable detail in the foregoing, it is to be understood that such detail is solely for the purpose of illustration and that many variations can be made by those skilled in the art without departing from the spirit and scope of the invention except as set forth in the claims.

What is claimed is:

1. In the preparation of a polyurethane foam by a process wherein an organic compound having at least two reactive hydrogen atoms determinable by the Zerewitinoff method, a molecular weight of at least about 500, an hydroxyl number of not more than about 225 and an acid number of not more than about 10 is reacted with an organic polyisocyanate in a reaction mixture containing an inert gas, said organic compound being reactive with said organic polyisocyanate to form a polyurethane, the improvement which comprises effecting the said reaction while the components are in admixture with a compound having the formula

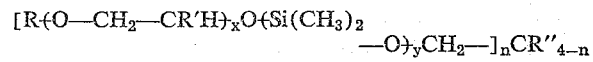

in which R represents a monovalent lower alkyl radical having from 1 to 5 carbon atoms, R' and R'' represent a member selected from the group consisting of hydrogen atoms and monovalent lower alkyl radicals having 1 to 5 carbon atoms, $x$ is a whole number greater than 3, $y$ is a whole number greater than 2 and $n$ is an integer of from 3 to 4.

2. The process of claim 1 wherein the grouping $(O-CH_2-CR'H)_x$ is composed of oxypropylene and oxyethylene groupings.

3. The process of claim 1 wherein the organic compound having at least two reactive hydrogen atoms is a polyalkylene ether having at least two terminal alcoholic hydroxyl groups.

4. The process of claim 1 wherein the diisocyanate is an isomeric mixture of 80 percent 2,4-toluylene diisocyanate and 20 percent 2,6-toluylene diisocyanate and the organic compound having reactive hydrogens is a polyalkylene ether having at least two alcoholic hydroxyl groups.

5. The process of claim 1 wherein the organic compound having reactive hydrogen is a polypropylene ether having at least two terminal hydroxyl groups.

6. The process of claim 1 wherein the compound represented by the formula is tris-(butoxy dioxypropylene dioxyethylene tri-dimethylsiloxymethyl) propane.

7. The process of claim 1 wherein the said reaction mixture contains water.

8. The process of claim 1 in which the inert gas is trichlorofluoromethane.

References Cited by the Examiner

UNITED STATES PATENTS 3,040,080    6/62    Kopnick et al. _____ 260—448.8

FOREIGN PATENTS 1,212,252    10/59    France.

LEON J. BERCOVITZ, *Primary Examiner.*

D. ARNOLD, *Examiner.*